Sept. 1, 1959     A. A. BERNARD     2,902,587
ARC WELDING PROCESS AND APPARATUS
Filed April 29, 1955     3 Sheets-Sheet 3
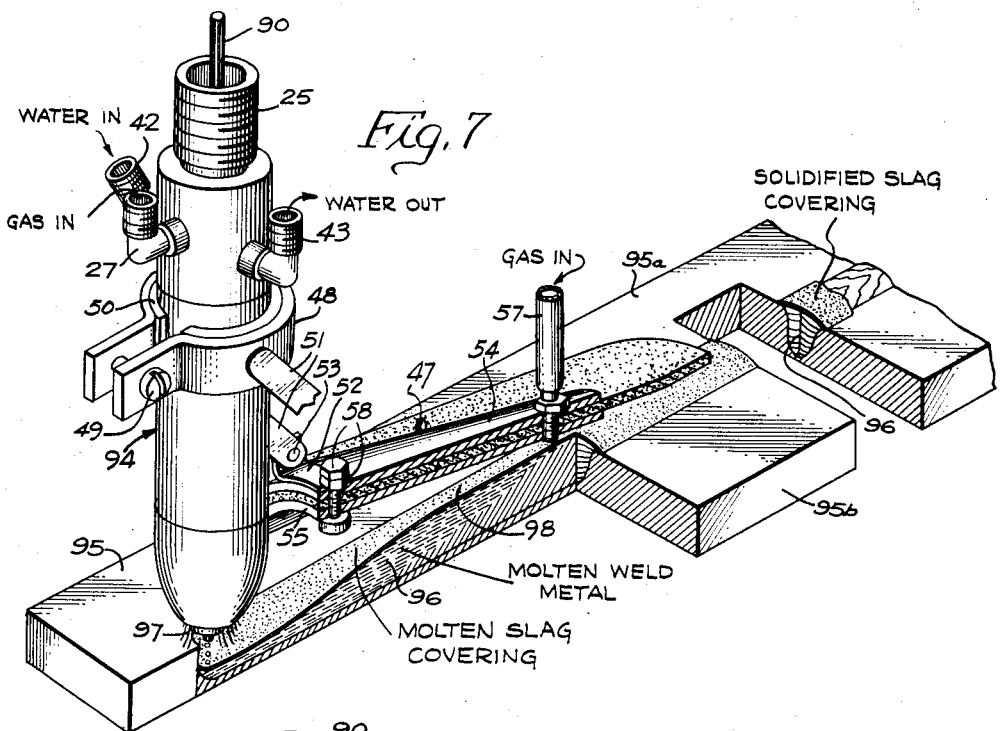
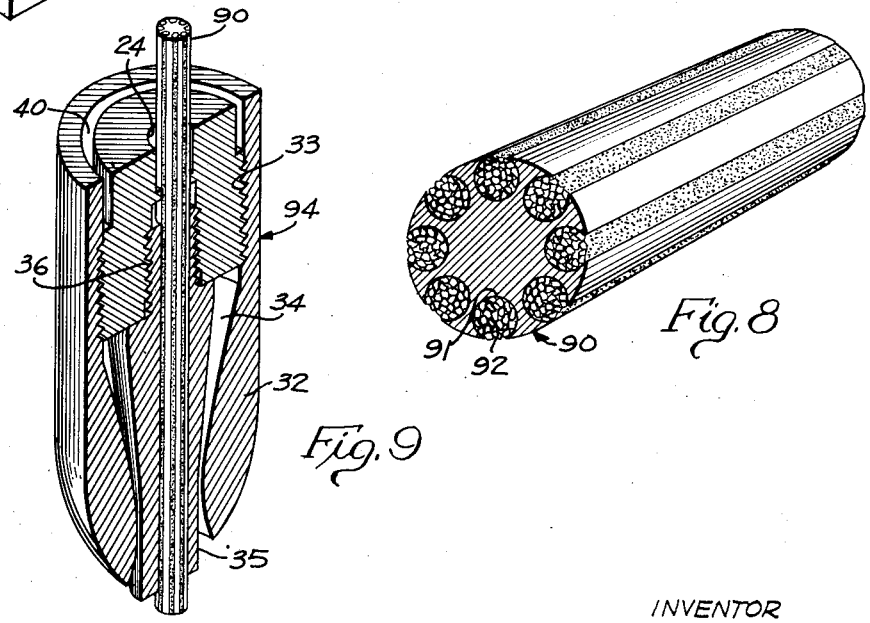
INVENTOR
Arthur A. Bernard
BY
Mason, Kolehmainen, Rathburn and Wyss.
Attys.

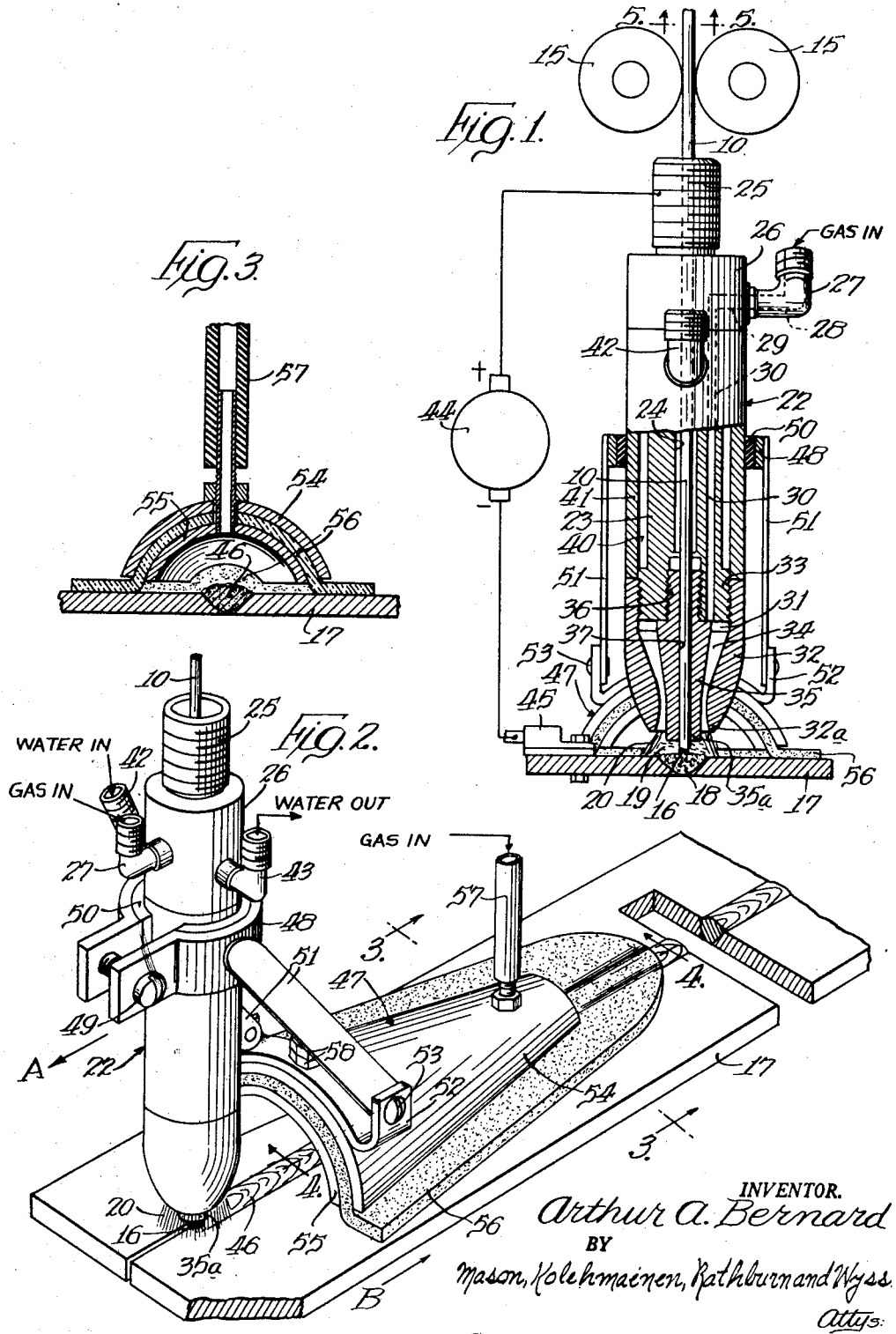

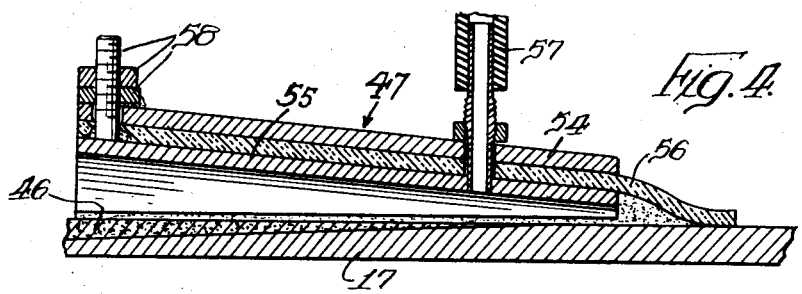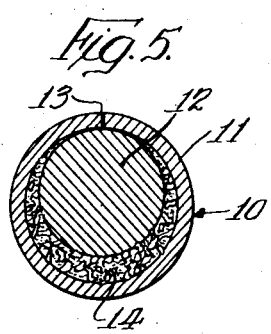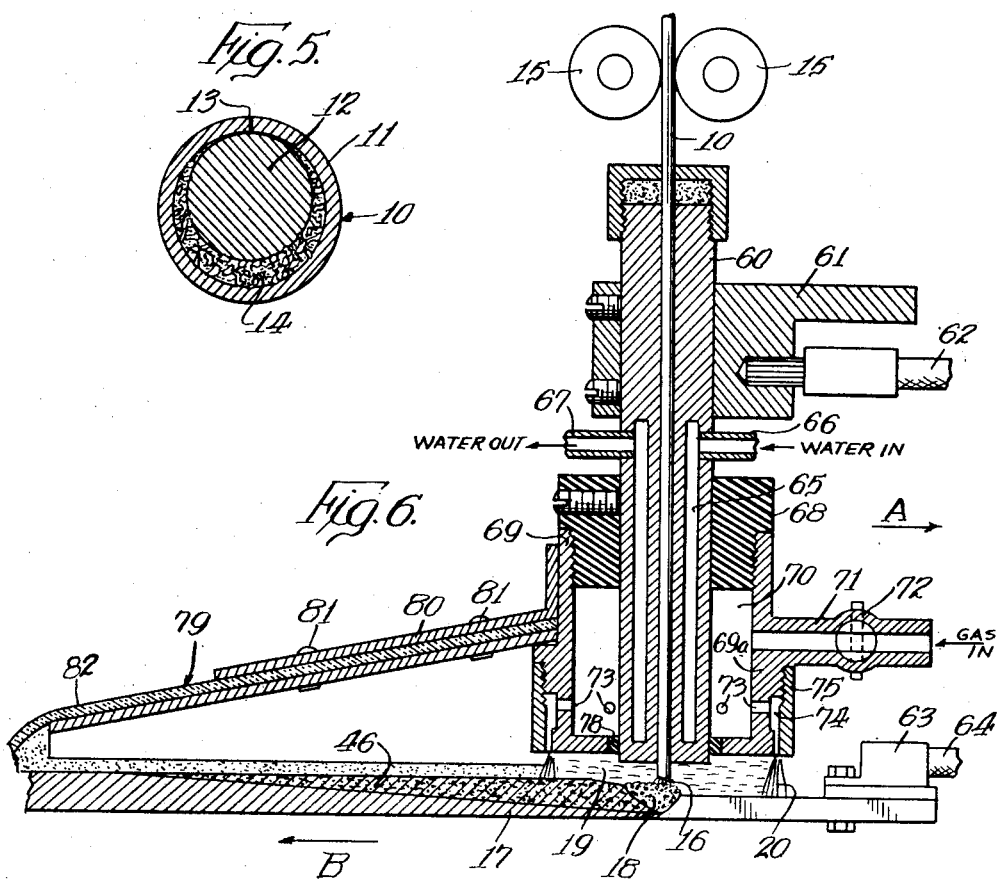

United States Patent Office 2,902,587
Patented Sept. 1, 1959

2,902,587

ARC WELDING PROCESS AND APPARATUS

Arthur A. Bernard, Chicago, Ill., assignor to Chemetron Corporation, Chicago, Ill., a corporation of Delaware Application April 29, 1955, Serial No. 508,268

12 Claims. (Cl. 219—74)

My invention relates to a welding process and apparatus particularly useful in connection with arc welding. In a broader sense, however, it relates to a method and apparatus for transferring metal, and, more generally, to a new and improved method and apparatus for utilizing an electric arc as a means for transferring metal from a welding rod or the like to a base metal.

Specifically, this application is a continuation-in-part of my prior application, Serial No. 424,977, filed April 22, 1954, which in turn is a continuation-in-part of my copending application, Serial No. 190,397, filed October 16, 1950, which in turn is a continuation-in-part of a prior application now Letters Patent No. 2,590,084, granted March 25, 1952.

In my copending application Serial No. 190,397, there has been disclosed an improved welding process and apparatus for carrying out the process, using a bare metallic electrode with means to prevent the arc from being contaminated by the atmosphere by providing a suitable shielding gas to exclude the atmosphere. It has been shown in this prior copending application that when using one of the inert noble monatomic gases such as helium, argon, etc., or when using carbon dioxide to provide a gas shield around the arc-generated gas, which shielding gas intermingles with the arc-generated gas to a minimum extent, an improved welding process is obtained.

In electric arc welding, metal may be transferred from a consumable electrode to a base metal by a flow of metallic globules driven by electromagnetic forces, by expansion of gases or vapors, or by some other force that is less readily explained. The heat generated by the electric arc renders a portion of the base metal molten, and this molten metal is combined with the metallic globules transferred from the consumable electrode to provide a mass of molten metal which, when cooled, integrally unites either a plurality of pieces of base metal or a surfacing layer and the base metal. In order to provide weld metal of the most desirable strength and ductility, it is necessary to control the degree of porosity thereof by controlling the occlusion of such gases as oxygen, nitrogen, and hydrogen from the atmosphere to the molten or fluid metal forming the weld metal.

In such a welding process the arc itself should be maintained only in the arc-generated gas or metal vapor, and the ordinary atmosphere should be wholly excluded from the arc stream. It is also important that the shielding gas be itself excluded from the arc to the maximum extent compatible with the necessarily close juxtaposition of such shielding gas and the arc.

It is believed that the arc path through which metal is transferred from a metal electrode to a base metal may be considered to exist as a narrowly defined zone closely surrounded by a second zone or region composed of metal vapors and arc-generated gas. The boundaries of these two zones are not readily determinable, and these two zones together are often regarded as the arc itself. If ordinary atmosphere or air reaches the arc, or if oxygen, nitrogen or hydrogen resulting from local reactions is present in the arc, whether it be considered the first zone or both of these zones, there would result a serious degree of oxidation or the formation of metal nitrides or both in the weld metal, usually accompanied by extensive porosity or "gassing" of the deposited weld metal, and in some cases it may largely prevent the stable, smooth arc action that is necessary for efficient and uniform deposition of metal to create a strong and sound weld.

The physical strength of the union between the base metal and the transferred metal is dependent to a large extent upon certain physical characteristics of the fluid metal, the surrounding gaseous medium, the rate of cooling, and the introduction of certain chemical elements. All of these characteristics must be capable of control in a satisfactory welding method, and such method must be adapted to operate at high speed with unrestricted visibility of the work or workpiece. Such method must also be adapted to use any of the standard sources of electric energy, such as an alternating current source of a direct current source with either straight or reversed polarity. The prior art methods of achieving control over these characteristics, and particularly the methods of eliminating the effects of the atmosphere on the arc and on the resulting weld, have comprised the use of various shielding means and methods, most of which have been both cumbersome and unsatisfactory for performing welding operations in many applications. Some prior art methods have provided chemical and mechanical shields through fluxes applied either to the wleding electrode or over and around the seam to be welded. Such fluxes applied either in the form of coatings or loose form have been found to be somewhat inconvenient for ease of operation and inadequate in other cases to accomplish the production of welds of sufficiently high quality. For example, when the arc and weld pool are submerged in a flux powder, it is impossible to observe the arc action or its progress, or any deviation from a particular direction. Furthermore, the removal, processing and cost of the flux are also deterrent factors. Prior to the invention set forth in my prior applications and prior patent referred to above, there have been proposals for use of gaseous shields, none of which have resulted in an arc welding technique comparable with that involving the use of chemical fluxes.

In my prior copending application, Serial No. 190,397, referred to above, there is disclosed a successful welding process and apparatus by means of which intermingling of a shielding gas with the arc-generated gas is maintained at a minimum, and it is believed that this has solved a problem long existing in the welding art. Undoubtedly, the failure of prior workers to prevent intermingling of the shielding gas regardless of its inertness with the arc-generated gas surrounding the arc has been the cause of prior art failure, which, due to the lack of smooth arc action and the great decrease in metal transfer of the arc by virtue of such nonsmooth arc action, interferes seriously with the essentials of arc stability and efficiency to precluded practical arc welding. Obviously, it is not possible completely to exclude a shielding gas from the arc stream because of the laws that govern gaseous diffusion. It is, however, possible to prevent turbulent or forcible intermixing with a shielding gas and the arc-generated gas by maintaining as nearly as possible a lamellar flow shielding gas about the arc, so that any minor penetration of the arc stream and surrounding arc-generated gas by the shielding gas supplied thereto is due solely or principally to diffusion and is not deleterious to the efficient functioning of the arc. The process of my prior copending application Serial No. 190,397 is, therefore, very satisfactory for welding metals such as aluminum and magnesium, and it has also been successfully used for welding light gauge stainless steel, copper and copper alloys. However, this process is not economically satisfactory for welding common or mild steel. To satisfactorily weld mild steel employing the process described in the above-mentioned copending application Serial No. 190,397, it is essential, in order to provide a sound weld of high strength and ductility without porosity, to employ some gas absorbing or deoxidizing agents such as silicon, aluminum or zicronium. In the development of the process of the present invention, it has been found that by the addition of certain gas absorbing or deoxidizing agents, or materials which serve to improve the grain structure of the deposited metal, notably aluminum, titanium, vanadium, columbium, molybdenum, tantalum, or zirconium, these gases causing porosity may be removed very effectively. Zirconium has been found to be very effective, since it not only degasifies the weld metal, but also is capable of desulphurizing the metal and otherwise improving its physical properties. Unfortunately, the addition of these gas absorbing agents to the weld pool so that they do not become "loaded" with gas before they can be injected into the molten metal has been a difficult problem. I have discovered that when these agents are incorporated in a composite electrode which is an especially fabricated rod or electrode they can be shielded from "loading" until they reach the weld pool, where their desirable gas absorbing characteristics are required. One such especially fabricated welding rod or composite electrode is fully disclosed and claimed in my copending application, Serial No. 343,097, filed March 18, 1953, and assigned to the same assignee as the present application.

More specifically, this especially fabricated welding electrode or rod may include an outer metal sheath including therein a core wire and a process powder or flux comprising zirconium and/or other elements which act as a getter material to reduce the amount of occluded gases in the fluid metal of the weld and thereby reduce the porosity of the metal to increase the physical strength thereof. The composite electrode may also comprise, as described hereinafter, a weld metal in the form of a rod with grooves, passageways, or pockets therein containing the necessary flux or process powder. The zirconium material, as described in detail hereinafter, also provides in its oxide form a material of high thermal electron emissivity, so that the welding electrode can be utilized in alternating current welding apparatus without the necessity of utilizing superimposed high frequency currents. This welding electrode has obviated the undesirable prior practices of either alloying the deoxidizing and gettering materials with the metal forming the electrode, or using loose, powdered fluxes for limiting the amount of oxidation of the metals forming the weld.

It has been found that this consumable welding rod or composite electrode may provide a vehicle for carrying, without prior deterioration, special agents into the weld pool. This especially fabricated electrode, which is an essential and important element in carrying out the process of the present invention, has many purposes and functions which include the following:

(1) It provides an efficient electrical connection between the source of welding current and the arc.

(2) It provides an efficient vehicle for the continuous supply of gas absorptive, electron emissive, and ionizable chemicals for the maintenance and stability of the arc and to impart density to the metallic deposit.

(3) It is a vehicle designed to provide a continuous supply of chemical elements which impart especial fluidity and metal transfer characteristics to the molten metal.

(4) It provides a continuous supply of filler metal, which, in the case of the composite electrode of my application Serial No. 343,097 referred to above, is made up of the three elements, namely, the sheath, core rod, and occluded powder, which upon fusion provides a molten metal which is metallurgically compatible with the base metal. In the case of other forms of composite electrodes, there is the sheath and the occluded powder.

In my prior copending application referred to above, Serial No. 190,397, carbon dioxide has been suggested as a shielding gas along with inert gases such as argon and helium. Carbon dioxide is not an inert gas, and, in fact, is a decomposable gas, and the fact that it has proven to be satisfactory is somewhat surprising. Whether or not the use of carbon dioxide as a shielding gas introduces carbon or oxygen into the weld is not fully understood, but it is known that it aids in preventing porosity and aids in providing a sound weld of high strength and ductility. Obviously, any of the inert or monatomic gases such as argon and helium, or mixtures of such gases, can be used in the process of the present invention. However, in a practical welding process the cost of the shielding gas must not be prohibitive. It will be understood by those skilled in the art that the cost of carbon dioxide gas is but a fraction of the cost of the monatomic gases such as argon and helium.

It has been recognized that as the shielding gas, whether it be one of the inert gases or carbon dioxide, comes in contact with the extremely high temperature of the arc, the gas is tremendously expanded, thereby resulting in a greatly reduced density and increased buoyancy. As a practical matter, therefore, the shielding gas rises rapidly, and the size of the weld zone which can be shielded from harmful elements present in the surrounding air is limited. This restricts the speed of welding if it becomes necessary to maintain the shielding gas around the weld for a predetermined length of time. Obviously, if one provided a nozzle of sufficient diameter, or provided such an increased volume of shielding gas, a larger area of the weld zone could be shielded. I have found that when a $3/16$ inch diameter electrode is used for welding plates $3/4$ of an inch in thickness, with 900 amperes of arc current at a welding speed of eleven inches per minute, molten weld metal extends for a distance of three and a half to four inches to the rear of the tip of the electrode. Thus, even if the nozzle were increased to a size that would provide a three-inch diameter gas shield, molten metal would extend for a distance of one and a half to two inches beyond the reach of the shielding gas. Obviously, liquid weld metal thus exposed to the oxygen would become oxidized and much of the beneficial effect produced would be eliminated. The same is true when welding plates much thinner than $3/4$ of an inch in thickness. For example, I have observed in a welding operation when welding plates $1/4$ inch in thickness, with a $3/16$ inch diameter electrode and 900 amperes of arc current at a speed of seventy-two inches per minute, that the length of the molten weld metal trailing the electrode would again be between three and a half to four inches in length. It would be desirable, therefore, to provide means in addition to the shielding gas arrangement referred to above to provide a protecting atmosphere or medium for the weld pool trailing the electrode. Whether this protecting atmosphere or medium shields, cushions, or has some affect on the weld chemistry, or includes a combination of all three, is not fully known, but it has been found that greatly improved welds result. In any event, it would be desirable to provide shielding or cushioning means not only for the arc zone, but for the molten weld pool as well. The protective atmosphere or medium for the molten weld pool may be gaseous, liquid or solid as specifically disclosed and claimed by copending joint application of Arthur A. Bernard and Richard A Bernard, Serial No. 496,260, filed March 23, 1955, and assigned to the same assignee as the instant application, so long as it provides a shield for excluding the atmosphere therefrom.

Accordingly, it is an object of the present invention to provide a new and improved process and apparatus for transferring metal from a consumable electrode to a base metal.

It is another object of the present invention to provide an improved method of electric arc welding in which a sound, nonporous weld can be produced.

It is another object of the present invention to provide in an improved welding process means for controlling the rate of cooling molten metal forming the weld and preventing the atmosphere from contacting the molten metal forming the weld trailing behind the arc.

A further object of the present invention resides in the provision of a novel method of transferring metal from a consumable electrode in which the characteristics of the weld produced are capable of being controlled within predetermined limits.

A still further object of the present invention is to provide a new and improved method of electric arc welding which is capable of obtaining deeper penetration and higher "burn off" rates by the use of relatively cheap welding materials.

It is another object of the present invention to employ an arc shielding gas for shielding the arc, which has but a fraction of the cost of the commonly used shielding gases for this purpose.

Another object of the present invention resides in the provision of a novel method electric arc welding in which a shielding gas is applied to an area encircling the electric arc, and a shielding medium of some sort is provided for a portion of molten weld metal extending outwardly away from said arc so as to enclose the pool of molten metal forming the weld.

Still another object of the present invention resides in the provision of an improved process of electric arc welding and apparatus therefor which is capable of welding at high speeds with unrestricted visibility of the work.

Another object of the present invention resides in a welding process employing an improved electrode composition in combination with a shielding gas for shielding one or both the arc zone and the molten weld metal extending outside the weld pool within the arc zone.

It is another object of the present invention to provide a welding process employing a composite electrode including a metal rodlike member containing certain chemical elements therewithin in combination with a shielding gas for shielding the arc zone, and further with the provision of a shielding medium for shielding the molten weld metal extending outside the weld pool.

Further objects and advantages of the present invention will become apparent as the following description proceeds, and the features of novelty which characterize the invention will be pointed out with particularity in the claims annexed to and forming a part of this specification.

In accordance with these and many other objects, a preferred embodiment of the process and apparatus of the present invention comprises introducing a shielding gas, preferably carbon dioxide, both in an area surrounding an electric arc and also into a confined area spaced from the electric arc but in tandem therewith over an elongated pool of molten metal for the purpose of controlling the cooling of this metal to improve the physical characteristics of the weld formed thereby. An improved composite electrode is preferably used in connection with this process and apparatus, and this improved electrode preferably contains a gas absorbing agent which is a metal of the group consisting of aluminum, titanium, vanadium, columbium, molybdenum, tantalum, silicon or zirconium, in an amount of from about 0.1% to in excess of 5%, and preferably from about 0.5% to about 6% by weight of the electrode. The shielding gas may be introduced both around the arc and into the confined space shielding the molten weld pool, or it may be introduced around the arc and subsequently directed and confined within a suitable hood or shielding means disposed over the molten weld pool. As disclosed in the above-mentioned joint copending application, the composite electrode may be provided with means for retaining flux containing materials which form a thin easily removed slag coating over the molten weld metal.

For a better understanding of the present invention reference may be had to the accompanying drawings in which:

Fig. 1 is a somewhat schematic view, partially in section, of an apparatus also embodying the present invention for carrying out the process of the present invention;

Fig. 2 is a perspective view of the apparatus of Fig. 1, assuming that Fig. 1 shows the complete structure, and with certain portions of Fig. 2 cut away better to illustrate the operation of the present invention;

Fig. 3 is a sectional view taken on line 3—3 of Fig. 2;

Fig. 4 is a sectional view taken on line 4—4 of Fig. 2;

Fig. 5 is a greatly enlarged sectional view taken on line 5—5 of Fig. 1;

Fig. 6 is a somewhat schematic sectional view of a modification of the apparatus used in carrying out the process of the present invention;

Fig. 7 is a perspective view quite similar to Fig. 2, illustrating a modification of the present invention;

Fig. 8 is an enlarged perspective view of a portion of the electrode which may be employed with the apparatus of Fig. 7; and Fig. 9 is a somewhat enlarged perspective view, partly in section, of a portion of Fig. 7.

Referring now to the drawings, and particularly to Figs. 1 to 5 thereof, there is illustrated an electrode structure 10 which has the external appearance of a bare metal electrode, but which in effect comprises the structure disclosed and claimed in my copending application, Serial No. 343,097, referred to above. The electrode 10 may have different external diameters depending upon the particular application thereof. The electrode 10 is a composite electrode and comprises an outer sheath 11, as best shown in Fig. 5 of the drawings, which for a particular welding operation such as welding ordinary steel may be formed of a strip of mild steel. Within the metal sheath 11 there is contained a suitable core rod 12, which also may be formed of the same material as the sheath 11, or, if desired, of different material. The core wire 12 has a smaller diameter than the internal diameter of the sheath 11. Preferably, the sheath 11 is formed of strip material which is deformed to form a tube including the seam 13 therein. The core wire 12 is disposed in intimate contact with the seam 13 effectively to caulk this seam and is held in that position by means of a suitable granulated filler material 14 comprising a metal or compound of a metal of the group mentioned above. This additive metal or compound fills a crescent-shaped space within the sheath 11, as is clearly obvious from Fig. 5 of the drawings. The welding process of one modification of the present invention includes as an important element thereof the use of an electrode 10 including a material such as zirconium contained therein, although it will be understood that other materials such as aluminum or tantalum, etc., might be employed.

The composite electrode 10, which, as far as the operation of the welding apparatus of the present invention is concerned, appears like a bare wire electrode, may be fed by feed rollers 15 to maintain an arc 16 between the lower end of the electrode 10 and a base metal 17. The heat of the arc is sufficient to melt the base metal or work 17 so that a pool of molten metal 18 is maintained as indicated. The arc 16 is in part composed of and in part surrounded by arc-generated gas or metal vapor that is indicated at 19. Surrounding this arc-generated gas area 19 is an envelope 20 of a shielding gas which serves to exclude the atmosphere from the arc-generated gas or metal vapor 19 and also from the arc 16. Thus, the body of arc-generated gas or metal vapor 19, together with such minor proportions of the gas from the envelope 20 as are inevitably present through diffusion, is the only matter in contact with the arc 16 and the molten metal 18. In my prior copending application, Serial No. 190,397, referred to above, it was pointed out that the arc 16 becomes unstable and may be extinguished in the event that it is penetrated to any substantial extent by the shielding gas 20, and such penetration of the arc by the shielding gas or any appreciable dilution of the arc stream by the shielding gas appears inevitably to alter the conductivity of the arc path to an extent sufficient to cause unstable arc operation or its ultimate failure. On the other hand, when the arc 16 is enclosed by the arc-generated gas or metal vapor 19 only, a smooth, stable arc is easily maintained. Nevertheless, it is necessary that the envelope 20 of shielding gas be maintained in order to exclude atmospheric air from the zone or zones constituted by the arc-generated gas or metal vapor 19 and the arc 16. The flow of the shielding gas 20 is adjusted with reference to the atmospheric pressure so that the atmospheric air is excluded from the region of the arc-generated gas 19. At the same time the pressure of the shielding gas 20 is maintained sufficiently low so that it is not caused to intermix in an amount sufficient to adversely affect the arc 16 or to dilute or otherwise disturb the arc stream.

Although the shielding gas defining the envelope 20 may be any one of the inert or monatomic gases such as helium, argon and the like, preferably, in accordance with the present invention, carbon dioxide gas is employed, which has proven to be unusually successful, and which is far less expensive than the inert gases heretofore commonly used. Obviously, any mixture or combination of these gases for forming a satisfactory shielding gas may likewise be employed.

For the purpose of continuously supplying the composite electrode 10 to the arc 16, the composite electrode 10 is fed by the feed rollers 15 through an electrode holder or nozzle generally designated at 22. This electrode holder 22 includes a central cylindrical body member 23 having a central longitudinal passageway 24, the diameter of which is somewhat greater than that of the composite electrode 10 so that the latter can readily be fed therethrough. The body member 23 has an extension 25, which is threaded, as indicated, for mounting the holder 22 on a suitable nozzle support mechanism that may be associated with the feed rollers 15 and may constitute a part of an automatic arc welding head, the details of the construction of which are well known and form no part of the present invention.

In order that a suitable shielding gas such as carbon dioxide may be supplied to form the envelope 20, the body member 23 has an enlarged cylindrical upper end 26 to which a connector fitting 27 is mounted and arranged to be connected to a suitable source of shielding gas, preferably carbon dioxide, although it might be connected to a source of helium or argon, or a mixture of gases to define a suitable shielding gas. The connector fitting 27 is provided with a suitable passageway 28 therein which communicates with a transverse passageway 29 in the upper end 26 of the electrode holder 22. This transverse passageway 29 communicates with a longitudinal passageway 30 that extends through the body member 23 parallel to the central longitudinal passageway 24. At its lower end the passageway 30 opens into an annular or ring-like opening 31 which is defined in part by the lower end of the body member 23 and a portion of the inner surface of a skirt 32, which, as indicated at 33, is threaded onto the lower end of the body member 23. The annular opening 31 is provided to distribute uniformly the shielding gas supplied by the passageway 30 into an annular opening 34, which is illustrated as having a Venturi-like cross section in Fig. 1 of the drawings, although it might have a uniform cross section, as, for example, is illustrated in Fig. 6 of the drawings. This passageway 34 causes the shielding gas to flow in a lamellar fashion to define the envelope 20 of the shielding gas described above surrounding the arc-generated gas or metal vapor 19 and the arc 16.

In order to define the somewhat annular chamber 34, there is provided an electrode jaw 35 which is threaded as indicated at 36 into the lower end of the body member 23. The annular passageway 34 is, therefore, defined by the inner surface of the skirt 32 and the outer surface of the electrode jaw 35. The electrode jaw 35 has a central longitudinal opening 37 therethrough for receiving the composite electrode 10 and directing it to the arc 16. The diameter of the opening 37 is so related to the diameter of the composite electrode 10 as to provide electrical contact engagement therewith for conducting welding current thereto.

As is fully disclosed in the above-mentioned copending application, Serial No. 190,397, the skirt 32 is threaded at 33 into the lower end of the body member 23, and the electrode jaw 35 is threaded thereto at 36. These threads are formed so as to have the same number of threads per inch, thereby facilitating the removal of the skirt 32 and the electrode jaw 35 should they by any chance become fused together by molten metal from the arc 16.

In order to be sure that no component of the shielding envelope 20 is directed inwardly so as to intermingle with the arc-generated gas and vapor 19, it is preferable that the lower end 35a of the electrode jaw 35 project below the lower end 32a of the skirt 32 for a distance approximately equal to the electrode diameter. This extension 35a of the electrode jaw 35 below the skirt 32 tends to insure lamellar flow of the shielding gas envelope 20 without any component directed toward the arc-generated gas and vapor 19. For certain applications I have discovered that the length of the arc 16 should preferably be maintained at about the order of the diameter of the electrode 10.

To prevent the fusion of molten metallic particles from the arc 16 to the skirt 32 and the electrode jaw 35, and the resultant partial closure of the lower end of the annular passageway 34, as well as to insure the avoidance of corona, provision is made for circulating a coolant, such as water, through the electrode holder or nozzle 22. For this purpose an annular chamber 40 is provided in the body member 23. The annular chamber 40 surrounds the passageways 24 and 30, and may be defined by a sleeve 41 disposed beneath the enlarged portion 26 and secured thereto by any suitable means such as welding, brazing, silver soldering and the like. Connector fittings 42 and 43 are provided, as better shown in Fig. 2 of the drawings, for supplying cooling water to the annular chamber 40. It is preferable that the skirt 32 and the electrode jaw 35 be formed of metal having good thermal conductivity as well as good electrical conductivity. Preferably, they are formed of copper, and sufficient water is supplied and circulated through the annular chamber 40 to extract heat from the electrode holder or nozzle 22 to maintain the temperature of the skirt 32 and the electrode jaw 35 low enough to minimize fouling by metal particles, as well as to preclude the formation of corona and consequent dissipation of arc energy.

Any suitable source of energy such as is commonly employed with electric arc welding may be utilized. As illustrated in the drawings by way of example, there is shown a generator 44 diagrammatically designated as a direct current generator. As illustrated, the positive terminal of the generator is connected to the electrode holder or nozzle 22, while the negative terminal 45 is connected to the base metal or work 17. This arrangement is known in the art as a reverse polarity connection for maintaining the welding arc 16, and has been found to be very satisfactory. It is also possible to employ as the source of welding current a direct current generator connected with what is termed straight polarity, or to employ an alternating current source with or without superimposed high frequency energy for further stabilizing the arc.

In the above description mention has been made of a welding speed of so many inches per minute. It will be appreciated that relative movement between the electrode holder or nozzle 22 and the work 17 must occur. This can be accomplished either by moving the work or by moving the electrode holder or nozzle 22. In Fig. 2 of the drawings there are included an arrow A and an arrow B. The arrow A indicates the direction of movement of the welding head or nozzle 22 in the event that it is moved and the work 17 is held stationary, while the arrow B indicates the direction of movement of the work in the event that the work is moved and the welding head or nozzle 22 remains stationary. In either case, there occurs an advance or forward movement of the welding zone, which advance is toward the left, as viewed in Fig. 2 of the drawings, with the result that there is a pool of molten metal disposed on the trailing side, or, in other words, on the right side of the electrode holder or nozzle 22, as viewed in Fig. 2 of the drawings. This pool of molten metal is designated by the reference numeral 46 and is best shown in Figs. 3 and 4 of the drawings.

From the above description it will be appreciated that there has been provided a shielding envelope of shielding gas 20 which satisfactorily prevents the atmosphere from coming in contact with either the arc proper or the surrounding arc-generated gas. As was pointed out above, however, a substantial section of molten metal trails behind the welding zone, which molten metal is designated by the reference numeral 46. It will be observed also that a substantial portion of this molten metal is outside the shielding zone furnished by the shielding envelope 20. If a large enough nozzle were provided so that this shielding envelope might be of the order of a foot in diameter, then complete shielding of the molten metal 46 would be provided. Such a large nozzle would be impractical from the standpoint of viewing the arc zone, and, moreover, would be prohibitive from the standpoint of the amount of shielding gas required. In accordance with the present invention, there is provided means for blanketing with a shielding medium the welded joint immediately behind the welding zone. As already mentioned, this can be accomplished either by a gaseous, liquid or solid blanket or a combination thereof. In Figs. 1 to 4 of the drawings, a gaseous medium is employed and to this end there is provided a trailing hood generally designated by the reference numeral 47.

As illustrated, this trailing hood 47 defines a housing for providing a chamber enclosing a substantial length of the weld, and, specifically, the portion 46 thereof which is still in molten condition. This trailing hood 47 may be supported in any suitable manner in insulated relationship with respect to the electrode holder or nozzle 22. As illustrated in Fig. 2 of the drawings, a suitable clamp 48 is provided which is clamped by fastening means 49 to the exterior of the electrode holder or nozzle 22. An interposed ring of insulation 50 is provided to insulate the trailing hood 47 from the electrode holder or nozzle 22. A pair of arms 51, which may be welded or otherwise secured to the clamp 48, are connected to a somewhat U-shaped member 52, as by fastening means 53. The U-shaped member 52 has its bight portion of curved shape to conform with the contour of the trailing hood 47. Obviously, this trailing hood 47 may have any contour, but is specifically illustrated as having a somewhat cylindrical contour.

To define the housing portion of the trailing hood 47, there are provided two wall sections 54 and 55, which are adapted to be nested together and to support therebetween a flexible heat resistance member 56, which may comprise a sheet of asbestos cloth or the like. The asbestos cloth 56 is adapted to extend beyond the peripheral portions of the nesting members 54 and 55 so as to define a flexible heat resistance sealing skirt engageable with the work 17 so as to define a seal all around the trailing hood 47, except at the front thereof adjacent the electrode holder or nozzle 22. As illustrated in Figs. 2, 3 and 4 of the drawings, the trailing hood 47 is provided with a gas inlet 57 into which additional shielding gas, and preferably carbon dioxide, is supplied. As illustrated, this shielding gas is fed to the trailing hood 47 near the rear thereof and provides a blanket of shielding gas or medium within the trailing hood 47 to completely blanket the molten metal within this hood and adjacent the arc 16, thereby preventing the atmosphere from in any way adversely affecting the molten weld pool.

Preferably, the trailing hood 47 is cooled as by a water jacket or the like, not shown in the drawings.

It will be appreciated that the flexible skirt or apron extending beyond the confines of the main supporting portions of the walls 54 and 55 defines a seal around the trailing hood unaffected by any irregularities in the work. The U-shaped member 52 is preferably welded or otherwise secured to the wall member 54 as by fastening means 58, which also holds the elements of the trailing hood 47 in assembled relationship.

While the trailing hood 47 has been illustrated as having a particular configuration, it will be apparent that it might be rectangular in shape or have innumerable configurations, so long as it provides a chamberlike member for confining shielding gas. It will also be appreciated that the asbestos apron may be dispensed with, and the edges of the trailing hood 47, which may be formed of metal or preferably a ceramic, may ride along the surface of the work. If desired, suitable spring means may be included to bias the trailing hood 47 into sealing engagement with the work.

It will be understood that the composite welding electrode 10 is fed toward the base metal or work 17 at a rate such as to maintain the arc 16, and the required amount of molten metal 18 within the immediate arc zone. The flow of shielding gas through the annular passageway 34 is adjusted so that it does not create turbulence or disturb the normal operation of the arc 16 and yet forms a shield or coat that surrounds the arc-generating gas or metal vapor 19 and excludes contact of the latter and the arc 16 with atmospheric air. At the same time a supply of shielding gas or medium for blanketing the molten weld pool 46 is supplied to the trailing hood 47. Enough gas or medium is supplied to insure complete blanketing. I have discovered that by supplying a blanket of shielding gas by means of the trailing hood 47 the characteristics of the weld are greatly improved. These improved characteristics may be due to shielding, thermal cushioning, or some change in the weld chemistry, or a combination of several or all of them. It is intended in the appended claims to cover this important feature of my invention regardless of the particular theory which may be involved to explain the reasons for the beneficial effect obtained.

The trailing hood or canopy 47, in extending rearwardly relative to the direction of movement between the welding apparatus and the work 17, in no way interferes with the operator's visibility of the arc, as will be readily apparent from an examination of Fig. 2 of the drawings. It is, moreover, possible to operate the welding apparatus utilizing the present method at a much higher speed and with greater control over the work that was possible heretofore. Furthermore, the desirable results are accomplished without the requirement of masses of powdered fluxing material used by prior art arrangements which materially reduce the operator's visibility. While it is believed that the trailing hood 47 provides a shielding means and thermal cushioning means for the molten weld metal to insure the formation of a sound weld of high strength and ductility, there may be cases where more rapid cooling may be desirable, or where special properties are to be imparted to the weld metal by means of introducing special gases or mediums into the trailing hood or canopy 47 or introducing special materials into the composite electrode. The hood 47 also provides a certain degree of protection from metallic splatter and arc glare which might otherwise become an occupational hazard to personnel within the welding area. It will be appreciated that the welding speed can be greatly increased, since the shielding gas within the trailing hood 47 can maintain a protective atmosphere for a sufficient distance behind the arc regardless of the speed of travel to insure a sound weld.

It will be appreciated that a separate gas supply need not necessarily be furnished to the trailing hood 47, but, instead, it may get its gas supply solely from that passing through the passageway 34. Such an arrangement has been disclosed in Fig. 6 of the drawings. As illustrated in Fig. 6, the same electrode 10, having the cross section of Fig. 5, is fed by means of feed rollers 15 to maintain the arc 16 between the lower end of the electrode 10 and the base metal or work 17. The arc melts the metal so that a pool of metal 18 is maintained, as indicated in Fig. 6 of the drawings. The arc-generated gas or metal vapor is indicated at 19, although this region has been somewhat exaggerated in Fig. 6 for purposes of clarity. As in the preceding embodiment, the arc-generated gas or metal vapor 19 is surrounded by an envelope 20 of shielding gas which serves to exclude the atmosphere from the arc-generated gas 19 and the arc 16.

As illustrated in Fig. 6 of the drawings, the feed rollers 15 feed the electrode 10 through an electrode holder or jaw 60 that preferably is formed of a material having good electrical and heat conducting properties such as copper. A conductor 61 is secured to the electrode holder or jaw 60 near its upper end for supplying current thereto. The current may be obtained by a conductor 62 from a suitable source, as will be understood readily, the conductor 62 being connected to the connector 61, as shown in the drawings. In accordance with conventional practice, the base metal or work 17 is connected to another terminal of the current source through a connector 63 and a conductor 64.

For the purpose of extracting heat absorbed from the arc 16 by the electrode holder or jaw 60, there is provided an annular chamber 65 near the lower end of the electrode holder 60, and a suitable coolant such as water may be circulated therethrough by way of a water inlet 66 and a water outlet 67.

To supply shielding gas and to produce the envelope 20 described above, the electrode holder 60 is illustrated as extending through an insulating bushing 68 into a cylindrical housing 69, the inner wall of which with the outer surface of the electrode holder 60 defines an annular chamber 70 supplied with a suitable shielding gas, preferably carbon dioxide, although it might comprise one of the monatomic gases such as helium, argon and the like, or a mixture thereof. This shielding gas may be supplied to the annular chamber 70 by means of a conduit 71, and the shielding gas flow may be controlled or regulated by a suitable valve 72. Suitable ports 73 are provided in the wall of the housing 69 which open into an annular chamber 74 defined by the inner surface of a ring or sleeve 75, and the outer surface of the lower end of the housing 69. The ring 75 is threaded as indicated into a flange 69a formed on the housing 69. This annular chamber 74 serves to distribute shielding gas so that it flows uniformly to create the envelope 20, which is generally annular in configuration and constitutes a curtain surrounding the body of the arc-generated gas or metal vapor 19 to preclude its contact with air. An insulating ring 78 insulates the lower end of housing 69 from the electrode holder or jaw 60, the upper end of which is already insulated by the insulating bushing 68.

As in the preceding embodiment, the arrows A and B have the same significance and the trailing hood 79 is provided, which is supported from the housing 69 in any suitable manner. As illustrated, a suitable L-shaped member 80, secured to the hood 79 as by rivets 81, is welded or otherwise secured to the housing 69. Unlike the arrangement disclosed in Fig. 2, no separate source of shielding gas is provided for the trailing hood or canopy 79. Instead, the supply of this shielding gas is the excess of gas provided for the envelope 20. The relative movement during the welding operation tends to direct the shielding gas from the envelope 20 into the trailing hood 79, so that a protective atmosphere is provided therein for the molten weld pool designated at 46 in Fig. 6 of the drawings. It should be understood that a suitable work conforming skirt 82, such as is employed in connection with Figs. 1 and 2 of the drawings, may be employed within the arrangement of Fig. 6.

In view of the detailed description included above, the operation of the apparatus of the present invention in carrying out the process of the present invention will readily be understood by those skilled in the art. The invention contemplates the use of an improved composite electrode. The invention, furthermore, contemplates the use of such an improved electrode with either a shielding gas to provide the envelope 20, or a shielding gas together with a shielding medium for the trailing weld pool which may comprise a trailing hood. The invention also contemplates a combination of all three, namely, the use of an improved or composite electrode, the shielding gas for providing the shielding envelope around the arc zone, and a shielding medium for the trailing weld pool. It is believed that the best results are obtained by a combination of all three features of the present invention, but more satisfactory results than with prior art means have been obtained by a combination of any two, and it is intended in the appended claims to cover the arrangements that are not necessarily the optimum but are far superior to prior art arrangements. The trailing hood where employed is preferably in contact with the base metal 17 so as effectively to be completely closed on the sides and rear end. If it is not in engagement with the work or base metal 17, and particularly if a substantial space exists, air currents and magnetic arc blowouts may destroy its usefulness. Moreover, the volume of shielding gas required to maintain the necessary shielding blanket is excessive as compared with the arrangements disclosed. Although the present invention is not limited to the use of carbon dioxide as a shielding gas, the cost of carbon dioxide is so much less than other satisfactory shielding gases that, as a practical matter, carbon dioxide is substantially the only satisfactory gas for the purpose.

As was pointed out above, the present invention is concerned with an arrangement employing a composite electrode for use in a continuous arc welding process in which a gas shield is provided around the arc and in which a shielding medium or blanket is provided over the so-called trailing weld pool in order to shield the same from the atmosphere and to provide other desirable effects. In the above-described embodiment, a gaseous medium was used to provide the shielding blanket over the arc, but, obviously, as in the welding processes employing electrodes having a coating of slag forming materials, a blanket of slag may be provided over the trailing weld pool to shield the same as is disclosed in the aforementioned copending joint application, or a combination of a gaseous blanket and a slag blanket may be employed.

Referring now to Figs. 7, 8 and 9 of the drawings, there is illustrated in Fig. 8 an electrode structure 90 which has the external appearance of a bare metal electrode, but which is, in effect, a composite electrode. As illustrated, the electrode 90 is provided with a plurality of grooves defined in the periphery thereof, which grooves are designated by the reference numeral 91. These grooves are indicated as being filled with a suitable flux or process material generally designated at 92. The composite electrode 90, although differing structurally from the electrode 10 described above, is still quite similar, since both comprise composite electrodes including a substantial or major portion thereof of metal, the particular composition of which will be dependent upon the type of welding operation to be performed. Contained in the composite electrode in each case is the flux or process material which it is desired to supply to the arc stream. The arrangement of Fig. 8 has been found to make sound welds, and the details of this material will be discussed with more particularity in the following description. It will be appreciated, however, that the electrodes 10 and 90 may have other configurations than those shown and may be constructed in various manners so long as there is provided the necessary metal and the associated flux or process material, and wherein the composite electrode has the appearance of a bare wire so that it may be used readily in a continuous electric welding process. Thus, the electrode structure is by way of example only and the particular design employed will be dependent upon the ease and cost of manufacture. In case the electrode is used for welding mild steel, the metal portion of the composite electrode will preferably be mild steel.

The flux or filler material 92 incorporated in the composite electrode 90 supplies the chemical elements necessary for improving the weld, as well as any chemical elements necessary to act as gas absorbers, arc stabilizers and the like. In certain embodiments built and successfully tested, the flux 92 also contained certain quantities of slag forming materials such as titanium as well as other oxides. The filler may, as disclosed in the aforementioned copending joint application, contain such materials as silicon, manganese, iron or iron oxides in addition to or in combination with the materials set forth above. It may also contain materials such as ferrosilicon, ferromanganese, ferrovanadium, ferrotitanium, manganese oxides, iron oxides, titanium dioxide or silicon dioxide. It may also include a small quantity of zirconium. Actually, if titanium dioxide in one of its natural states is used, a small quantity of zirconium will automatically be included. The specific elements comprising the filler material may be varied substantially as far as the present invention is concerned, but they should contain an arc stabilizer, a gas absorber and material for improving the weld chemistry, together with a suitable binder such as sodium silicate to hold the material together. The binder material may also contribute one or more of the other functions named. In certain instances, gas generating materials may also be included, although preferably the shielding gases are supplied from a separate source, as described in the embodiment above.

Referring now to Figs. 7 and 9 of the drawings, the electrode 90 is illustrated as being fed to a suitable electrode holder, generally designated at 94, which may be identical with the electrode holder 22 described earlier. In fact, in Figs. 7 and 9 of the drawings the same reference numerals are employed to designate the corresponding parts thereof. In Fig. 7 of the drawings, an arc is illustrated as being maintained between the lower end of the electrode 90 and a base metal 95. In the drawings the base metal 95 is illustrated as comprising two sections 95a and 95b, which are welded together at a seam 96. The heat of the arc is sufficient to melt the base metal or work 95 so that a pool of molten metal 96 is maintained. Surrounding the arc is a shielding medium 97 which may be identical with the shielding medium 20 described in connection with the preceding embodiment. Moreover, the gas defining the curtain 97 surrounding the arc may be identical with that described in connection with the preceding embodiment. Likewise, the electrode 90 may be fed toward the arc in the manner described above, and the electrode holder 94 way be identical in every respect with that described above.

In a particular embodiment built and successfully tested, the electrode 90 had the grooves 91 thereof filled with a mixture, by volume comprising 50% powder titanium dioxide and 50% of a compound containing iron, silicon and zirconium. These materials in powdered or granular form were uniformly mixed and held together by means of a binder comprising sodium and silicon oxide, for example, sodium silicate. The electrode 90 with the above described flux in the grooves 91 was employed with a shielding gas of carbon dioxide and an arc voltage of 25 volts. The weld was produced at 31½ inches per minute, and very sound welds were obtained covered by a thin, relatively uniform coating of slag designated by the reference numeral 98. This slag was, of course, molten immediately behind the arc and gradually solidified. The solidified slag was readily removable. Tests were made with various sized electrodes, and specifically with an electrode having a 5/32 inch outside diameter. The slag covering over the molten weld metal, commonly referred to as the trailing weld pool, provided a thin coating over the entire surface of the weld. It will be appreciated that if further shielding of the molten weld pool is desired, a combination as shown in Fig. 7 of the slag shielding and the gaseous shielding by using the trailing hood may be employed. It should be understood that the trailing shield may be dispensed with in either Fig. 2 or Fig. 7 if gaseous shielding of the trailing weld pool is found unnecessary or is not desired.

In view of the detailed description included above, the operation of the apparatus disclosed in Figs. 7 to 9 of the drawings for carrying out the alternative process of the present invention will readily be understood by those skilled in the art. In any of the embodiments of the present invention, the composite electrode, the gas shielding of the arc stream itself, and the provision of a suitable shielding blanket for the molten weld pool provides a greatly improved welding process from which superior welds may be produced without the disadvantages of the prior art arrangements.

In summary, the embodiments of the improved method and apparatus of transferring metals provide an improved welding process which can be utilized to produce high strength joints at high welding speeds utilizing either alternating or direct current with little or no preparation of the metals to be joined. The methods above are further characterized in providing high deposition or "burn off" rates as a result of the increase in current density obtained by the use of the novel methods and novel composite electrode referred to above. In addition, this method provides high speed welding with unrestricted visibility of the arc and does not require the use of loose flux powders which both obscure the electric arc and are a source of porosity in the weld metals formed.

While there has been described an improved process of transferring metal, it should be understood that various changes and modifications thereof will occur to those skilled in the art, and it is intended in the appended claims to cover all those changes and modifications which fall within the true spirit and scope of the present invention.

What is claimed as new and desired to be secured by Letters Patent of the United States is:

1. In an apparatus for arc welding a base metal, a consumable metal electrode to form an arc for transferring metal from the electrode to the base metal, means including an annular nozzle to form an annular continuous curtain of shielding gas surrounding the arc, said curtain of gas being the only means for enclosing said arc and arc-generated gas, said curtain of gas being directed against the base metal at such an angle that no component of said curtain of gas is directed toward said arc to enclose the arc and the arc-generated gas and to exclude atmospheric air from access to the arc while being itself substantially excluded from the arc and from deleterious intermingling with arc-generated gases, a trailing hood forming a partial enclosure over the molten weld pool to one side of said arc, and means for supplying a shielding gas to said trailing hood.

2. In welding apparatus wherein an arc is maintained between a consumable metallic electrode and work on which the welding operation is to be performed for transferring metal from the former to the latter, a nozzle for guiding said electrode toward said work, said nozzle having an annular opening around and spaced from said electrode shaped to direct a flow of gas in the form of an annular continuous curtain of gas around and out of contact with said arc and enclosing the region of gas generated thereby, means for causing relative movement between said work and said electrode whereby weld metal in molten condition extends to one side of said arc, a hood enclosing said molten metal to one side of said arc including means in sealing engagement with said work, and means for supplying a gas to said hood to shield the molten metal within said hood from the surrounding atmosphere.

3. Apparatus for transferring metal from a consumable composite electrode to a base metal, comprising electrode holding means for holding said electrode, said electrode holding means being relatively movable in a predetermined direction with respect to said base metal, means defining a partially enclosed cavity supported in generally fixed relationship with respect to said holder and extending outwardly therefrom in a direction opposite to said predetermined direction, the arc drawn between said electrode and said base metal during a metal transfer operation being disposed to one side of said cavity and adjacent an open end thereof, said cavity being in fluid communication with the pool of molten metal beneath said electrode during a metal transfer operation, said pool of molten metal including a portion extending to one side of said electrode, said cavity being of approximately the same length as said portion of said pool, and means for supplying carbon dioxide gas to said cavity defining means to form a shielding blanket for said portion of said pool.

4. Electric arc welding apparatus for transferring metal from a consumable composite electrode to a base metal, comprising electrode holding means for holding said electrode, means for producing relative movement between said electrode holding means and said base metal thereby to advance the welding zone in a selected direction, a pool of molten material being formed in said welding zone beneath said electrode during a welding operation and extending along a line of weld for a distance from a point beneath said electrode in a direction opposite to said selected direction, means defining a partially enclosed cavity mounted in relatively fixed relation with respect to said electrode holding means and extending outwardly therefrom in a direction opposite to said selected direction, said electrode being disposed outside said cavity, said cavity being in fluid communication with the molten metal extending from said welding zone and being of approximately the same length as the molten metal extending from said welding zone, said cavity also opening adjacent to said electrode, and means for supplying a carbon dioxide gaseous medium to said cavity to form an atmosphere thereof blanketing the molten metal extending from said welding zone.

5. The process of electric welding wherein a consumable composite electrode comprising a hollow tubular member containing a flux in the form of several chemical elements for improving the weld chemistry stabilizing the arc and absorbing gases is spaced from a metal workpiece which comprises establishing an electric arc between said composite electrode and said metal workpiece, continuously feeding said composite electrode at a predetermined rate toward said workpiece whereby the metal in said electrode is melted by the heat of said arc, releasing said flux into said arc as said electrode is consumed, producing relative movement between said arc and said metal workpiece to produce a mass of molten metal to one side of said arc, producing an envelope of shielding gas around said arc to form an atmosphere encircling said arc, and maintaining a blanket of shielding medium over said mass of said molten metal to one side of said arc to shield the same while in a molten condition.

6. The process of electric welding wherein an effectively endless consumable mild steel composite electrode having the electrical characteristics of a bare wire and a flux including silicon is continuously fed toward a metal workpiece and which comprises establishing an electric arc between said electrode and said workpiece, releasing said flux into said arc as said electrode is consumed, producing relative movement between said arc and said metal workpiece to produce a mass of molten metal to one side of said arc, producing an envelope of carbon dioxide gas around said arc to form an atmosphere encircling said arc, and maintaining a blanket of shielding medium over said mass of said molten metal to one side of said arc to shield the same while in molten condition.

7. The process of electric welding wherein a composite electrode containing a process powder including zirconium is spaced from work to be welded which comprises establishing an electric arc between said electrode and said work, feeding said composite electrode at a predetermined constant rate toward said work to be welded for conversion to molten metal by the heat of said arc, continuously releasing said process powder into said arc as said electrode is consumed, producing relative movement between said arc and said work to produce a mass of molten metal to one side of said arc defining the line of weld, producing an envelope of carbon dioxide gas around said arc to form a shielding atmosphere around said arc, directing said shielding atmosphere from said arc around said mass of said molten metal to one side of said arc, and momentarily maintaining a blanket of said shielding gas over said mass of molten metal.

8. The process of electric welding wherein a composite electrode containing a process powder is spaced from work to be welded which comprises establishing an electric arc between said electrode and said work, continuously releasing said process powder into said arc as said electrode is consumed, producing relative movement between said arc and said metal to produce a mass of molten metal along a line of weld to the rear of said arc, producing an envelope of shielding gas around said arc to form a shielding atmosphere encircling said arc, providing a chamber in sealing engagement with said work over said line of weld to the rear of said arc, and supplying a shielding gas to said chamber for blanketing the molten portion of metal along said line of weld.

9. The method of welding metals which comprises maintaining an electric arc between the tip of a consumable composite electrode and a welding zone of the metal to be welded, providing an envelope of shielding gas around said arc to blanket said arc and the molten portions of said metal forming the weld pool immediately adjacent said arc during a welding operation, advancing said welding zone and envelope of shielding gas along a line of weld, advancing a confining hood in sealing engagement with the metal to be welded behind and remote from said welding zone so as to house therein the molten metal along said line of weld but not said arc or electrode, and supplying a shielding gas to said hood to blanket the welded joint following behind said welding zone.

10. The process of claim 5 wherein the amount of flux contained in the electrode is between 0.5% and 6% by weight of the electrode.

11. The method of welding metals which comprises maintaining an electric arc between a welding zone of the metal to be welded and the tip of a consumable composite electrode having a granular core of material formed of various chemical elements contained within an outer sheath, continuously feeding said consumable composite electrode toward the welding zone of the metal to be welded whereby the metal in said electrode is melted by the heat of the arc, causing said elements forming said core to be released into said welding zone, providing an envelope of shielding gas from a separate source of said gas around said arc to blanket said arc and the molten portions of said metal forming the weld pool immediately adjacent said arc during a welding operation, advancing said welding zone and envelope of shielding gas along a line of weld, and maintaining a blanket of shielding medium over the molten metal behind said welding zone.

12. The method of welding metals which comprises maintaining an electric arc between a welding zone of the metal to be welded and the tip of a consumable composite electrode having a core of material formed of various chemical elements including silicon contained within an outer sheath, continuously feeding said consumable composite electrode toward said welding zone where the metal of said electrode is melted, causing said elements including silicon to be released into said welding zone, providing an envelope of shielding gas from a separate source of said gas around said arc to blanket said arc and the molten portions of said metal forming the weld pool immediately adjacent said arc during a welding operation, advancing said welding zone and envelope of shielding gas along a line of weld, and providing a blanket of shielding medium over the molten metal behind said welding zone to shield said molten metal from atmosphere at least while said metal is in molten condition.

References Cited in the file of this patent
UNITED STATES PATENTS

| | | |
|---|---|---|
| 1,501,266 | Brace | July 15, 1924 |
| 1,531,828 | Armor | Mar. 31, 1925 |
| 1,552,369 | White | Sept. 1, 1925 |
| 1,589,017 | Lincoln | June 15, 1926 |
| 1,629,748 | Stoody | May 24, 1927 |
| 1,711,151 | Lincoln | Apr. 30, 1929 |
| 2,350,387 | Cito | June 6, 1944 |
| 2,504,867 | Muller | Apr. 18, 1950 |
| 2,544,711 | Mikhalapov | Mar. 13, 1951 |
| 2,644,070 | Herbst | June 30, 1953 |
| 2,694,764 | Muller | Nov. 16, 1954 |